March 17, 1936.　　　P. E. TWISS ET AL　　　2,034,543
REROLL MECHANISM
Filed Jan. 26, 1935
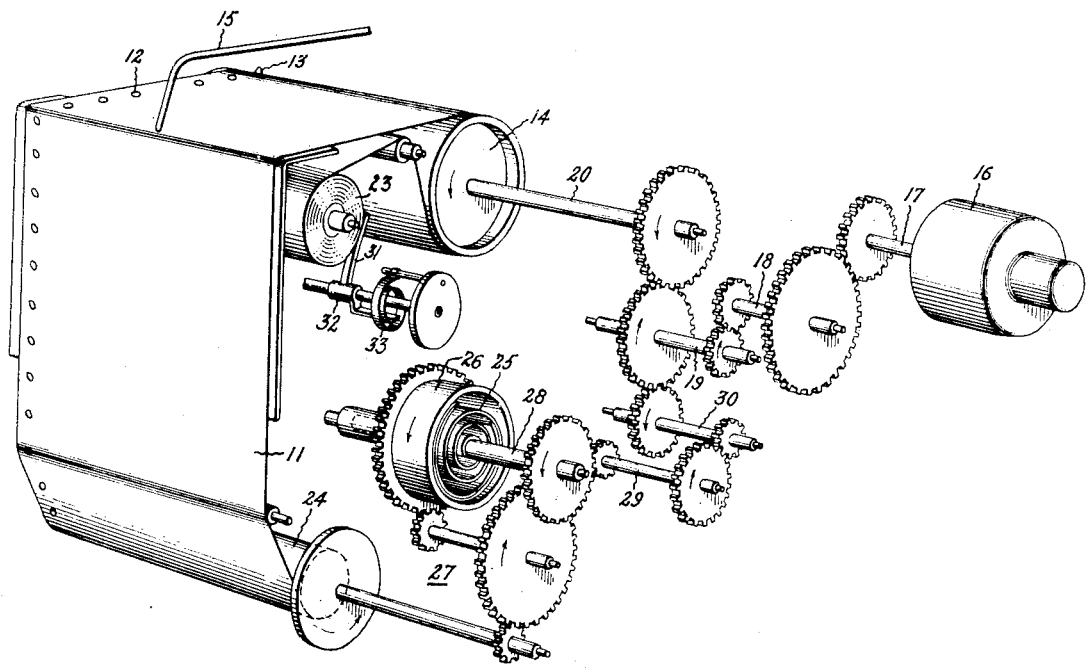
Inventors:
Paul E. Twiss,
George W. Sprenger,
by Harry E. Dunham
Their Attorney.

Patented Mar. 17, 1936

2,034,543

UNITED STATES PATENT OFFICE 2,034,543

REROLL MECHANISM

Paul E. Twiss and George W. Sprenger, Lynn, Mass., assignors to General Electric Company, a corporation of New York Application January 26, 1935, Serial No. 3,618

4 Claims. (Cl. 242—55)

Our invention relates to recording instruments and concerns particularly chart-advancing mechanisms suitable for such devices where the chart is advanced at a uniform rate.

It is an object of our invention to provide a mechanism for maintaining the strip chart in the recording instrument under substantially constant tension and maintaining a smooth and accurately timed passage thereof along the chart carriage.

It is another object of our invention to eliminate back lash in the gearing between the timing motor or clock and the chart-carrying rolls.

Still another object of our invention is to provide an arrangement which is unaffected by variations in the diameters of the chart supply roll and reroll and which permits tearing off portions of the chart whenever desired.

A further object of our invention is to provide a chart carriage having a self-winding reroll spring and an arrangement which permits a portion of the chart to be withdrawn from the reroll for examination and automatically rewound after the examination.

Strip chart recorders are commonly provided with changeable gear trains between the timing motor and the timing drum to permit obtaining various chart speeds; for example, variations from a predetermined number of inches per hour to a predetermined number of inches per minute. There is often such a number of gears in the train that considerable back lash may be introduced. This back lash may interfere with the accuracy of the timing of the chart motion where the chart is subject to forces applied both through the driving or timing drum and the reroll bobbin.

Where a friction brake applied to the supply roll is depended upon to balance the force of an independent reroll spring and to keep the strip chart smooth, a considerable variation may take place in the force applied to the strip chart owing to the variation in relative diameters of the supply roll and the reroll and owing to the running down of the reroll spring. This condition may also result in reversal of the relative directions of the force between the strip chart and the timing drum, particularly if the spring is wound more than once for a complete chart, or if chart sections are torn off, reducing the diameter of the reroll to a minimum. Such reversal of the direction of force may permit the chart position to deviate considerably from its correct time position owing to the back lash in the gear train. It is an object of our invention to provide an arrangement in which these difficulties are obviated.

The features of our invention which we believe to be novel and patentable will be pointed out in the claims appended hereto. A better understanding of our invention may be obtained from the following description taken in connection with the accompanying drawing in which the essential working elements of a chart-advancing mechanism are shown schematically in perspective and with the elements drawn apart for the sake of clarity in the illustration.

In the drawing, a strip chart of the usual type is shown at 11 having perforations 12 along one side thereof registering with sprockets 13 on a timing drum 14 which is provided for accurately timing the motion of the strip chart 11.

A recording pen 15 of any suitable type carried by a measuring instrument may be provided for producing a record curve on the chart 11. However, my present invention does not concern the recording pen and measuring features of the apparatus and these, therefore, need not be further illustrated.

A constant-speed timing motor, for example, a synchronous electric motor represented in the drawing by the sealed shell 16 enclosing the rotating portion may be provided for driving the timing drum 14 at a uniform speed and for winding a reroll spring 25. While we have referred to the use of a synchronous motor in carrying out our invention, it will be understood that the invention is not limited thereto but obviously embraces the use of any suitable types of timing motors, including spring clocks or motors, whether hand-wound or motor wound, and by the term "motor" in the specification and claims we mean to include any such device. A gear train, consisting of gears mounted on spindles 17, 18, 19, and 20, is provided for transmitting the rotation of the motor to the timing drum 14 and for effecting the desired change in speed.

The chart 11 is drawn from a supply roll 23 and is rewound on a reroll 24. A reroll spring 25 is provided for rotating the reroll 24 and maintaining the record strip 11 under tension. The reroll spring 25 is mounted within a rotatable barrel 26 which is connected by suitable gearing 27 to the reroll 24. In order to wind the reroll spring 25, one end of the spring is connected through gears on the spindles 28, 29, 30, and 19 to the spindle 19 which forms a part of the gear train between the motor 16 and the timing drum 14.

The outer end of the spring 25 frictionally engages the inner surface of the barrel 26 so that slippage takes place between the reroll spring 25 and the barrel 26 when the reroll spring 25 is fully wound and the timing motor continues to operate. The gear ratios are such that, but for the resilient connection and the slippage in the reroll spring unit, the reroll bobbin 24 would be driven at a higher peripheral speed than the timing drum 14. As the strip 11 is wound upon the reroll bobbin 24, the peripheral speed of the roll of strip becomes greater than that of the bobbin itself but the occurrence of greater slippage in the reroll spring unit prevents any variations in the motion of the strip chart. It is apparent that tearing off a portion of the strip or using a short record strip other than standard will not interfere with the proper operation of the apparatus.

The outer turn of the spring 25 may be composed of a plurality of leaves united as by welding, for example, in order to obtain greater stiffness. In this way, even slippage without jumping is permitted when the spring is fully wound. This arrangement also permits the spring to be wound tighter than would otherwise be the case before slippage takes place. Inasmuch as slippage tends to take place after the spring has been wound to a predetermined tightness and exerts a predetermined torque, the record strip 11 will be maintained under a more nearly constant tension than is possible with a hand wound spring.

When one desires to examine a portion of the record made on the strip 11, which has already been wound upon the reroll bobbin 24, the examination may readily be made by pulling out the chart and unwinding the reroll until the desired portion of the chart is visible. The unwinding of the reroll either winds up the reroll spring 25 or causes it to slip in the barrel 26 as the case may be. When the strip chart is released, the resilient energy stored in the reroll spring 25 causes the reroll to be rewound and thereupon normal operation of the recorder may be resumed.

Our arrangement makes it unnecessary for an attendant to wind a reroll spring, and overcomes the operating difficulties which may occur with an independent reroll spring. Owing to the fact that torques supplied by the reroll spring 25 are continually acting in the gearing between the timing drum 14 and the reroll bobbin 24, and the fact that the energy for winding the reroll spring 25 as well as driving the timing drum 14 is supplied by the motor 16, the play in all the gearing is always taken up and there is no tendency for back lash. Likewise, the reroll spring 25 cannot overhaul the motor 16 and interfere with its constancy of speed.

In some cases, the friction of the chart 11 in the chart carriage may be sufficient to overcome the torque of the reroll spring 25, in which case the chart 11 will actually be driven by the timing drum 14 instead of being drawn through the chart carriage entirely by virtue of the torque of the reroll spring 25. Such friction would be without any consequence if the gearing from the motor 16 were arranged to mesh directly with the gear on shaft 20 instead of acting through an intermediate spindle 19. However, owing to mechanical difficulties in meshing the gear on the spindle 30 with that on the spindle 20, it may be desirable to employ the intermediate spindle 19 and the corresponding gears. In this case, a very slight amount of back lash owing to the slight play between the gears on spindles 19 and 20 may result in case the friction of the chart 11 in the chart carriage varies with respect to the torque of the reroll spring 25. This possibility of slight back lash may be overcome by increasing the friction of the chart 11 slightly to insure that the timing drum 14 will always be driven from the spindle 19 and the gear thereon rather than from the reroll spring. For example, we may provide a friction brake 31 for the supply roll 23 of any suitable type for applying a small frictional force to the chart 11. For instance, we may employ a friction brake of the type disclosed in United States Patent No. 1,913,176 granted to Twiss, June 6, 1933, in which the brake 31 carried by a collar 32 is pressed against the supply roll 23 by a spiral spring 33. However, the spring may be set at only relatively little tension.

In accordance with the provisions of the patent statutes, we have described the principle of operation of our invention together with the apparatus which we now consider to represent the best embodiment thereof but we desire to have it understood that the apparatus shown is only illustrative and that the invention may be carried out by other means.

What we claim as new and desire to secure by Letters Patent of the United States, is:

1. A chart-driving mechanism for a recording instrument comprising in combination, a motor, a chart-timing drum, gearing connecting said motor to said drum, a windable spring, gearing connecting said timing drum and one end of said spring, a friction clutch connected to the other end of said spring, a chart reroll bobbin, and gearing between said friction clutch and said reroll bobbin.

2. In a strip chart recorder, the combination of a motor, a chart-timing drum mechanically connected thereto, a chart reroll bobbin, a resilient energy storage device having two relatively movable portions tending to move relative to each other to release stored energy, and means connected to said reroll bobbin yieldably engaging one of the relatively movable portions of said energy storage device, the other of said relatively movable portions being mechanically connected to said motor.

3. In a strip chart recorder, the combination of a chart-timing drum, a chart reroll bobbin, a reroll spring having a driving end connected to said reroll bobbin and having a winding end, a train of gears connecting said timing drum to the winding end of said reroll spring, a friction clutch interposed in the connection to one end of said spring, and a timing motor connected to one of said gears.

4. In a strip chart recorder, the combination of a chart-timing drum, a chart reroll bobbin on which strip chart is wound during the operation of the recorder, a reroll spring having a driving end connected to said reroll bobbin and having a winding end, a train of gears connecting said timing drum to the winding end of said reroll spring and having a gear ratio such that the gears tend to drive the reroll bobbin with a greater peripheral speed than the timing drum, a friction clutch interposed in the connection to one end of said spring, and a timing motor connected to one of said gears.

PAUL E. TWISS.
GEORGE W. SPRENGER.